United States Patent [19]

Cornelius et al.

[11] 4,155,679

[45] May 22, 1979

[54] IRRIGATION SYSTEMS CONTROL

[75] Inventors: Gail Cornelius, Portland; Lloyd C. Olson, Beaverton, both of Oreg.

[73] Assignee: R. M. Wade & Co., Portland, Oreg.

[21] Appl. No.: 820,889

[22] Filed: Aug. 1, 1977

[51] Int. Cl.² .................. B23B 57/08; B05B 9/02
[52] U.S. Cl. .................................. 415/29; 137/244; 239/177
[58] Field of Search .............. 415/29; 137/344; 239/177, 212, 213

[56] References Cited

U.S. PATENT DOCUMENTS

| 2,865,599 | 12/1958 | Boyer | 415/29 |
| 3,623,663 | 11/1971 | Koinzan | 239/177 |
| 3,750,696 | 8/1973 | Cornelius | 137/344 |
| 4,067,497 | 1/1978 | Cornelius | 239/177 |
| 4,083,378 | 4/1978 | Stearns | 239/177 |
| 4,085,771 | 4/1978 | Hunter | 239/177 |
| 4,095,613 | 6/1978 | Townsend et al. | 137/344 |

Primary Examiner—C. J. Husar
Attorney, Agent, or Firm—Phillips, Moore, Weissenberger, Lempio & Majestic

[57] ABSTRACT

An irrigation control system includes a rotary water motor operatively associated with valves to provide that the water motor is either in the full on or full off condition, dependent upon alignment of the irrigation line. The irrigation control system also includes a rotary water motor operatively associated with a valve, and a shut-down system is included for closing such valve upon loss of water pressure in a safety line.

11 Claims, 3 Drawing Figures

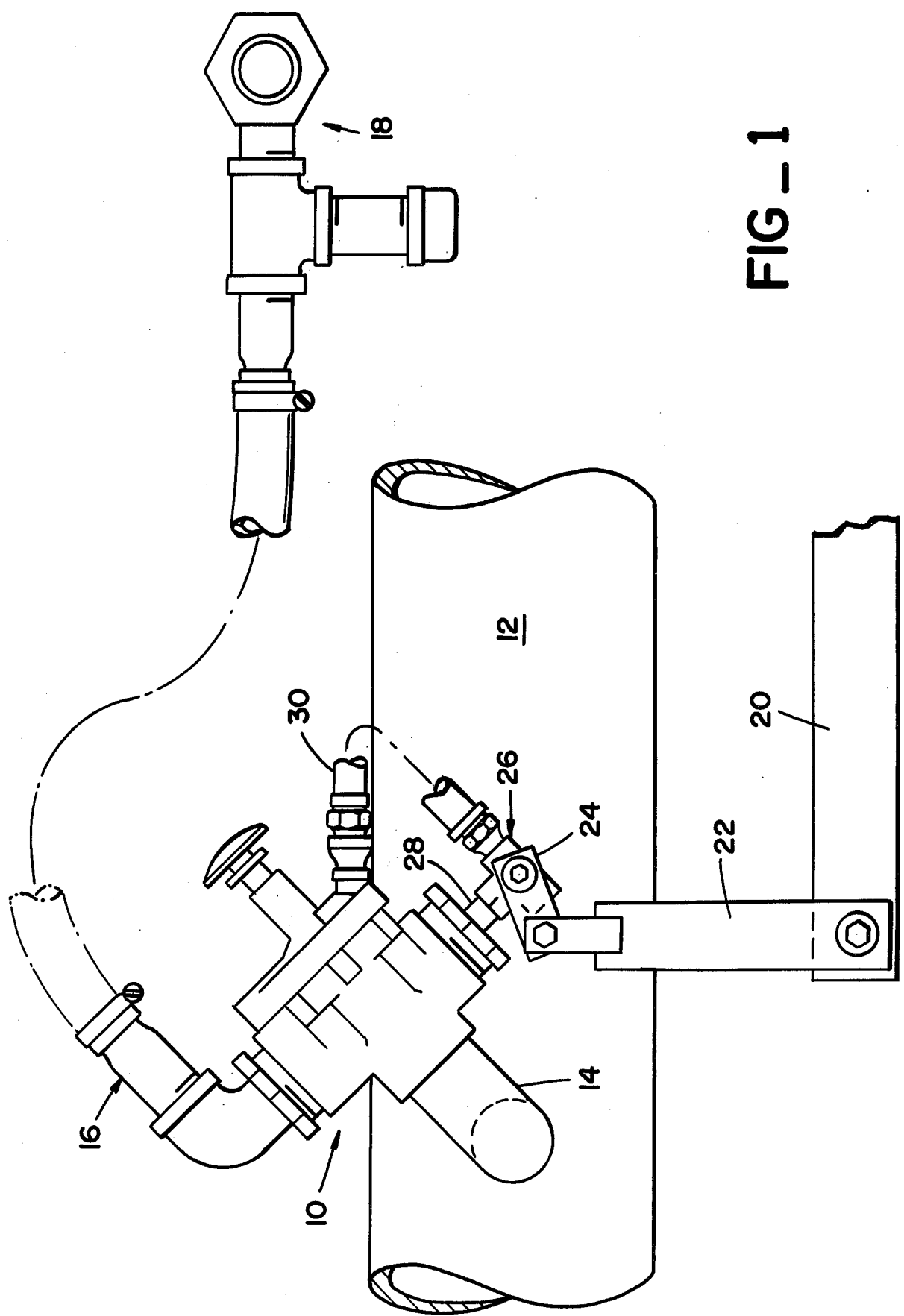

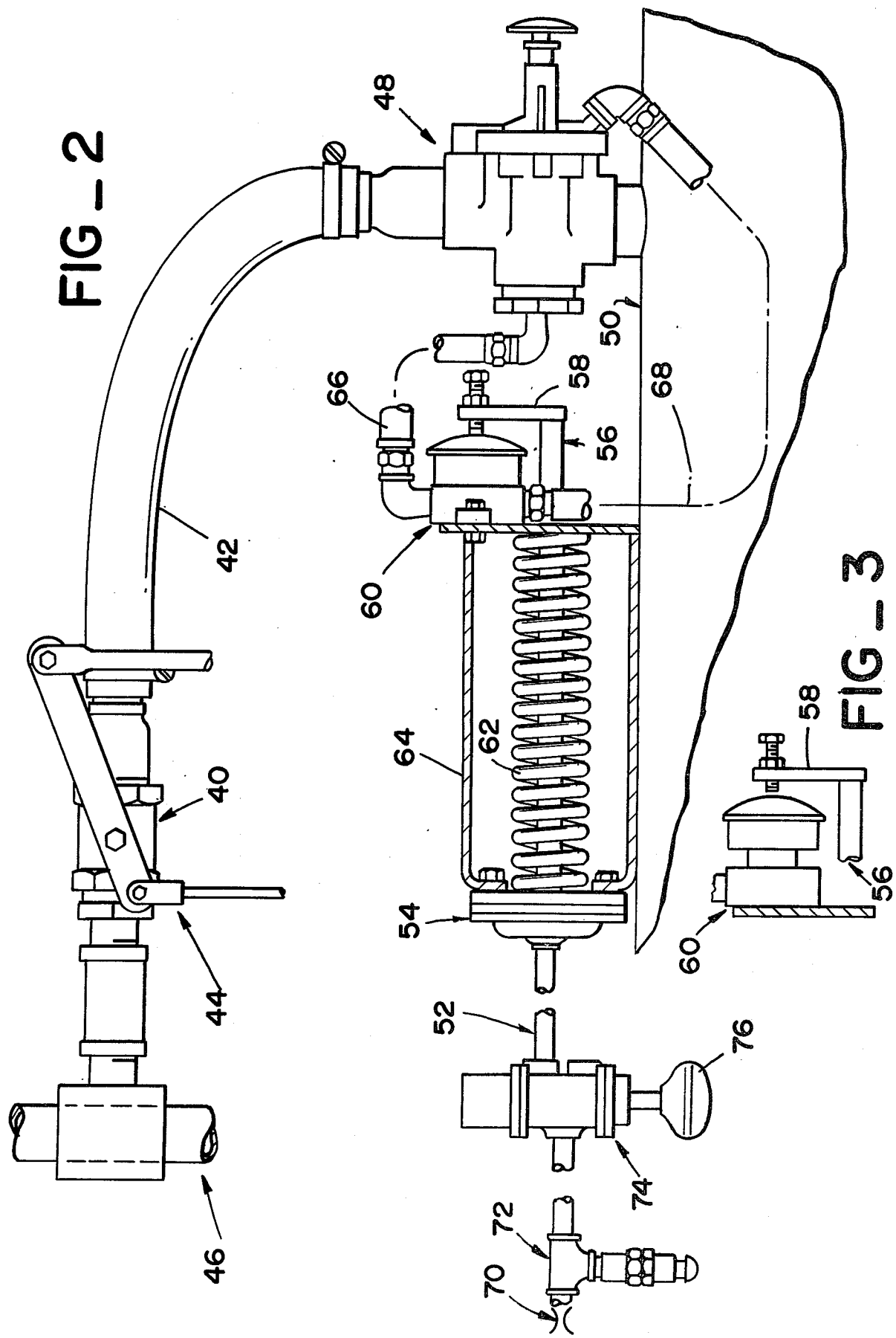

IRRIGATION SYSTEMS CONTROL

BACKGROUND OF THE INVENTION

This invention relates to irrigation systems, and more particularly, to systems for controlling operation of irrigation systems.

In a system of the type disclosed in U.S. application Ser. No. 746,456, now U.S. Pat. No. 4,108,200, entitled "BRAKE APPARATUS FOR IRRIGATION LINE" (assigned to the Assignee of this invention), apparatus for maintaining the alignment of an irrigation line is provided. As disclosed therein, a link is operatively associated with a relatively openable and closable valve, the link reading the degree of misalignment of portions of the irrigation line to in turn open and close the valve to supply increased and decreased water pressure to the rotary water motor as needed. While such a system has been found highly effective in maintaining proper alignment of an irrigation line, it has been found that under certain situations, in particular, at lower drive speeds of the irrigation line, one or more rotary water motors will stop rotating for a short period of time, meanwhile with water still exiting therefrom onto the field. It will be understood that even distribution of the water from the irrigation line is highly desired, and the state just mentioned, wherein water exiting from the water motor falls on one small area for any length of time, is to be avoided.

Additionally, reference is made to the U.S. Pat. No. 3,750,696 entitled "MAYDAY SAFETY SHUTOFF SYSTEM RESPONSIVE TO ERRANT TOWERS OF AN AUTOMATIC IRRIGATION SYSTEM" (assigned to the Assignee of this invention), disclosing as one embodiment thereof a safety shut-down system wherein a main valve is shut upon loss of pressure in a safety line. Such loss of pressure in the safety line occurs upon excessive misalignment of portions of the irrigation line. In the application of such a safety system to a center-pivot irrigation system, if for some reason the main valve does not close off upon a relatively high degree of misalignment being reached, the outer end water motor of the system continues to drive the end tower thereof, increasing the misalignment so that damage to the system occurs. United States application Ser. No. 700,226, now U.S. Pat. No. 4,067,497 entitled "SPEED GOVERNOR FOR IRRIGATION SYSTEM" (assigned to the Assignee of this invention) discloses in general a center-pivot irrigation system including a governor operatively associated with the outer tower and rotary water motor thereof.

SUMMARY OF THE INVENTION

It is accordingly an object of this invention to provide irrigation apparatus wherein valve means are operatively associated with a rotary water motor to provide that the water motor is either in a shut down or a fully driven state.

It is still a further object of this invention to provide an irrigation system including a pressurized safety line, wherein pressurized water is cut off from a rotary water motor of an irrigation line upon loss of pressure in the safety line.

Broadly stated, the invention is in an irrigation system including water motor means operable upon supply of water pressure thereto, and valve means operatively associated with the water motor means and operable to supply water pressure to and block water pressure from the water motor means. Further included are actuatable means operatively associated with the valve means for providing that the valve means respond to actuation of the actuatable means to provide (i) a certain relatively open valve means state, and (ii) a closed valve means state, without any operable valve means states therebetween.

Broadly stated, the invention comprises an irrigation safety shut-down system comprising an irrigation line to which pressurized water is supplied, water motor means, and openable and closable valve means operatively interconnecting the irrigation line and water motor means, opening of the valve means providing water pressure from the line toward the water motor means, and closing of the valve means blocking water pressure from the irrigation line to the water motor means. Further included is a safety line operatively communicating with the irrigation line, and means operatively interconnecting the valve means and safety line for providing that upon maintenance of water pressure of a certain level in the safety line, the valve means are open, and for providing that upon water pressure in the safety line falling below a certain level, the valve means are closed.

BRIEF DESCRIPTION OF THE DRAWINGS

These and other objects of the invention will become apparent from a study of the following specification and drawings, in which:

FIG. 1 is a plan fragmentary view of control apparatus for a rotary water motor of the apparatus;

FIG. 2 is an elevational fragmentary view of a safety shut-down system of the apparatus, with a valve thereof in one position; and FIG. 3 is a view of a portion of the FIG. 2 apparatus with the valve in another position.

DESCRIPTION OF THE PREFERRED EMBODIMENTS

A portion of an irrigation system is shown in FIG. 1, and reference is made to U.S. application Ser. No. 746,456 set forth above, wherein an alignment system for an irrigation line is disclosed. In such system, a link is operatively associated with another link and a valve actuating arm to provide relative opening and closing of such valve to provide increase and decrease in pressure of water supplied to a rotary water motor. In the present apparatus, a two-position openable and closable valve 10 communicates with the water-carrying line 12 by means of a conduit 14, and a conduit 16 connects the valve 10 and rotary water motor 18. The rotary water motor 18 is of course of the type operable upon supply water pressure thereto. With the valve 10 in a fully open position, water pressure is supplied from the line 12 through the conduit 14, through the valve 10, through the conduit 16 to drive the water motor 18. With the valve 10 in a closed position, water pressure is blocked from reaching the water motor 18. In the present apparatus, the link 20 and link 22, generally corresponding to similar links in U.S. application Ser. No. 746,456, are operatively associated with a pilot valve actuating arm 24 movable to open and close a pilot valve 26 which is in turn operatively associated with and receives water pressure from the valve 10 through a conduit 28. The conduit 28 is in continuous open communication with the conduit 14, so that water pressure in the line 12 is continuously communicated to the pilot valve 26.

With the pilot valve 26 in a closed position, no water pressure exists in a conduit 30 interconnecting the pilot valve 26 and valve 10, which determines a closed state of the valve 10, whereupon water pressure is blocked from reaching the water motor 18, so that the water motor 18 is not driven. Upon opening of the valve 26 through appropriate positioning of the links 20, 22, relative to the irrigation line 12, determined by relative alignment of portions of the irrigation line 12, a degree of water pressure exists in the conduit 30, determining that the valve 10 adopts a fully open state. Thus, full water pressure from the line 14 is transmitted through the valve 10 to the water motor 18 to drive the water motor 18 at full pressure. Because the valve 10 is capable of only a fully open or a fully closed state, without any operable states existing therebetween, it will be seen that the water motor 18 is driven at full torque as necessary, but water is completely cut off therefrom upon a state, for example, wherein that portion of the irrigation line stands still for a period of time. The achievement of such fully open and fully closed states is in response to actuation of the pilot valve 26. Thus, the problems set forth above relating to water exiting from the water motor 18 without the water motor 18 driving any portion of the apparatus is avoided.

Referring to FIG. 2, reference is made to U.S. Pat. No. 3,750,696 and U.S. application Ser. No. 700,226 (both assigned to the Assignee of this invention) hereby incorporated by reference. U.S. application Ser. No. 700,226 discloses a governor system for the end tower of a pivot irrigation system, such end tower being driven by rotary water motor means. In such system, a governor linkage is operatively associated with an openable and closable valve, and FIG. 2 shows such an openable and closable valve 40 in a conduit 42, the openable and closable valve 40 being operatively connected with a linkage 44 in turn operatively associated with governor means (not shown) all in accordance with U.S. application Ser. No. 700,226. The conduit 42 communicates with a rotary water motor 46 and a normally open two-way diaphragm valve 48. The diaphragm valve 48 is situated on the irrigation line 50 and communicates with water pressure in the irrigation line 50. The diaphram valve 48 is of the type which is either in a fully open or a fully closed position. With the valve 48 in its open position, it will be seen that water pressure is supplied from the line 50 through the valve 48, through the conduit 42 and through the valve 40 to the water motor 46, to drive the water motor 46. The governor linkage 44 operates with the valve 40 in accordance with U.S. application Ser. No. 700,226.

The system of FIG. 2 incorporates a safety line 52 of the type disclosed in FIG. 5 of U.S. Pat. No. 3,750,696. Such line 52 is of the type wherein upon loss of pressure therein, a main valve of the overall system is shut down. The safety line 52 is in operative communication with the irrigation line 50 so that the safety line 52 is normally pressurized by water pressure in the irrigation line 50. In this embodiment, the line 52 communicates with a diaphragm actuator 54 operatively coupled with an elongated L-shaped bar 56. The extended end 58 of the bar 56 is in operative association with a three-way pilot valve 60 shown in an open position, the valve 60 being movable to a closed position upon rightward movement of the bar 56. The bar 56 is biased into a leftward position by a helical spring 62 disposed in a casing 64, through which the bar 56 extends. The helical spring 62 tends to hold the valve 60 in an open position, and upon application of fluid pressure in the safety line 52, the diaphragm actuator 54 is actuated to move the bar 56 rightwardly (FIG. 3), allowing the pilot valve 60 to adopt a closed position. The pilot valve 60 is operatively coupled with the valve 48 by conduit 66 and conduit 68. A restrictor 70 is included in the conduit 52 as shown.

In the operation of the device, with fluid pressure being maintained in the safety line 52 during the normal operation of the apparatus, the bar 56 is in a rightward position (FIG. 3) moved against the resilience of the spring 62, so that the pilot valve 60 is allowed to adopt a closed position. Pressure from the line 50 is transmitted through valve 48 to conduit 66 interconnecting the valve 48 and pilot valve 60, but is blocked from passage therethrough so that no pressure exists in the conduit 68. This determines an open position of the two-way normally open diaphragm valve 48, so that water pressure passes through the valve 48 toward the water motor 46. The pilot valve 60 remains closed upon maintenance of a certain level of pressure in the safety line 52.

Upon pressure in the safety line 52 falling below a certain level, in accordance with U.S. Pat. No. 3,750,696, the diaphragm actuator 54 is deactuated so that the resilient spring 62 moves the bar 56 leftward to move the pilot valve 60 into an open position (FIG. 2). Thus, water pressure in the irrigation line 50 is transmitted through conduit 66, through valve 60, through conduit 68 to valve 48 to in turn determine a closed position of the valve 48. In this state, because the valve 48 is positioned between the irrigation line 50 and water motor 46 of the end tower of the overall irrigation system, the water motor 46 is completely shut down. Since in a pivot irrigation system of the type disclosed in U.S. application Ser. No. 700,226 the end tower water motor controls the overall operation of the system, the shutting down of such water motor 46 shuts down the entire system, avoiding the problems set forth above.

Further included in the safety line 52 are a safety system dump valve 72, and an end tower water motor shut-off valve 74, which may be actuated by movement of a handle 76 to selectively release pressure from the safety line 52, to achieve a full shut down state. Such shut down state will be in accordance with the above description, which is also dependent upon the release of water pressure from the safety line 52.

I claim:

1. In an irrigation system including water motor means operable upon supply of water pressure thereto, valve means operatively associated with the water motor means and operable to supply water pressure to and block water pressure from the water motor means, and actuatable means operatively associated with the valve means for providing that the valve means respond to actuation of the actuatable means to provide (i) a certain relatively open valve means state, and (ii) a closed valve means state, without any operable valve means states therebetween.

2. The apparatus of claim 1 wherein the valve means respond to actuation of the actuatable means to provide only (i) said certain relatively open valve means state and (ii) said closed valve means state.

3. The apparatus of claim 2 wherein the actuating means comprise pilot valve means.

4. The apparatus of claim 3 wherein the first-mentioned valve means comprise fully openable and closable valve means responsive to pilot pressure supplied thereto by the pilot valve means.

5. The apparatus of claim 4 wherein the water motor means comprise rotary water motor means.

6. The apparatus of claim 2 wherein the valve means comprise fully openable and closable valve means responsive to the actuation of the actuating means.

7. An irrigation safety shut-down system comprising an irrigation line to which pressurized water is supplied, water motor means, openable and closable valve means operatively interconnecting the irrigation line and water motor means, opening of the valve means providing water pressure from the line toward the water motor means, and closing of the valve means blocking water pressure from the irrigation line to the water motor means, and a safety line operatively communicating with the irrigation line, and means operatively interconnecting the valve means and safety line for providing that upon maintenance of water pressure of a certain level in the safety line, the valve means are open, and for providing that upon water pressure in the safety line falling below a certain level, the valve means are closed.

8. The apparatus of claim 7 wherein the means operatively connecting the safety line and valve means comprise pilot valve means operatively connected with the first-mentioned valve means.

9. The apparatus of claim 8 wherein the means operatively connecting the safety line and first valve means comprise said pilot valve means, closable upon maintenance of a certain level of pressure in the safety line, and openable upon the pressure in the safety line falling below a certain level.

10. The apparatus of claim 9 and further comprising resilient spring means operatively associated with said pilot valve means for resiliently biasing said pilot valve means into an open position.

11. The apparatus of claim 10 and further comprising shut-down valve means operatively connected with the safety line for selectively releasing pressure from the safety line.

* * * * *